US012784475B2

(12) United States Patent
Hsin et al.

(10) Patent No.: US 12,784,475 B2
(45) Date of Patent: Nov. 3, 2026

(54) METHOD OF IDENTIFYING A WHITEBOARD BASED ON IMAGE TOKENS

(71) Applicant: Kneron (Taiwan) Co., Ltd., Taipei City (TW)

(72) Inventors: Hsien-Kai Hsin, Taipei City (TW); Shr-Tze Wan, Taipei City (TW); Chia-Wei Wu, Yilan County (TW); Bike Xie, San Diego, CA (US); Ya-Lun Shih, Taipei City (TW)

(73) Assignee: Kneron (Taiwan) Co., Ltd., Taipei City (TW)

( * ) Notice: Subject to any disclaimer, the term of this patent is extended or adjusted under 35 U.S.C. 154(b) by 302 days.

(21) Appl. No.: 18/499,250

(22) Filed: Nov. 1, 2023

(65) Prior Publication Data

US 2025/0139996 A1 May 1, 2025

(51) Int. Cl.

| | |
|---|---|
| ***G06V 20/60*** | (2022.01) |
| ***G06T 5/00*** | (2024.01) |
| ***G06T 7/246*** | (2017.01) |
| ***G06T 7/73*** | (2017.01) |
| ***G06V 10/70*** | (2022.01) |

(52) U.S. Cl.

CPC ................ *G06V 20/60* (2022.01); *G06T 5/00* (2013.01); *G06T 7/246* (2017.01); *G06T 7/73* (2017.01); *G06V 10/70* (2022.01); *G06T 2207/20081* (2013.01)

(58) Field of Classification Search

CPC .......... G06V 20/60; G06V 10/70; G06T 5/00; G06T 7/246; G06T 7/73; G06T 2207/20081

See application file for complete search history.

(56) References Cited

U.S. PATENT DOCUMENTS

| | | | | |
|---|---|---|---|---|
| 8,564,674 B2 * | 10/2013 | Sasaki | H04N 23/673 | 348/208.1 |
| 11,790,572 B1 * | 10/2023 | Oulès | G06T 11/00 | 345/204 |
| 2012/0093361 A1 * | 4/2012 | Huang | G06T 7/277 | 382/103 |

(Continued)

FOREIGN PATENT DOCUMENTS

| | | |
|---|---|---|
| CN | 107038441 A | 8/2017 |
| CN | 111262874 A | 6/2020 |
| TW | 200951835 A1 | 12/2009 |

*Primary Examiner* — Amandeep Saini
*Assistant Examiner* — Andrew S Budisalich
(74) *Attorney, Agent, or Firm* — Winston Hsu

(57) ABSTRACT

A method of identifying a whiteboard based on image tokens includes setting a plurality of image tokens on the white-board, obtaining an image including the whiteboard from a camera, employing hardware or software techniques to detect image shaking in order to prevent a display of non-relevant content or privacy-sensitive information, detecting image tokens of the whiteboard by using a machine learning model, applying token tracking to the image tokens to enhance stability and robustness of token detection, calculating coordinates of the image tokens, determining an optimal mapping matrix based on the coordinates of the image tokens, mapping the image based on the optimal mapping matrix to generate a mapped image of the whiteboard, and displaying the mapped image on a screen.

10 Claims, 5 Drawing Sheets

(56) References Cited

U.S. PATENT DOCUMENTS

| | | | | |
|---|---|---|---|---|
| 2013/0114785 | A1* | 5/2013 | Alzen | G01R 33/5608 378/4 |
| 2013/0137482 | A1 | 5/2013 | Sheikh | |
| 2019/0303708 | A1* | 10/2019 | Kim | G06V 20/10 |
| 2020/0121228 | A1* | 4/2020 | Taylor | A61B 5/00 |
| 2021/0326301 | A1* | 10/2021 | Vutukuri | G06F 16/1734 |
| 2022/0198622 | A1* | 6/2022 | Kumar | G06N 3/0464 |
| 2022/0335159 | A1* | 10/2022 | Hahn | G06F 21/6281 |
| 2022/0346885 | A1* | 11/2022 | Kunio | A61B 5/7267 |
| 2023/0196609 | A1* | 6/2023 | Klinger | G06T 7/73 701/28 |
| 2023/0230555 | A1* | 7/2023 | Ding | G09G 3/36 345/214 |
| 2023/0277271 | A1* | 9/2023 | Lavallée | A61B 34/32 700/254 |
| 2024/0062518 | A1* | 2/2024 | Li | G06V 20/52 |
| 2024/0314277 | A1* | 9/2024 | Peng | H04N 9/3194 |
| 2025/0078457 | A1* | 3/2025 | Tseng | G06T 7/248 |

* cited by examiner

METHOD OF IDENTIFYING A WHITEBOARD BASED ON IMAGE TOKENS

BACKGROUND OF THE INVENTION

1. Field of the Invention

The present invention is related to a method of identifying a whiteboard, especially a method of identifying a whiteboard based on image tokens.

2. Description of the Prior Art

A whiteboard is a white surface made of plastic or tempered glass that can be written repeatedly with a special whiteboard pen and can be wiped with a special whiteboard eraser. It is often used for classroom teaching, meeting discussions, or personal notes. From the mid-1990s, whiteboards began to be commonly used. Before that, almost only blackboards were common.

Whiteboards are usually more expensive than blackboards. Compared with the chalk dust left after writing on a blackboard, a whiteboard is easier to wipe than a blackboard because the whiteboard does not raise powder particles when wiping. In addition, the contrast of pictures or words written on the whiteboard is relatively high. However, because whiteboards tend to reflect light, people far away from the whiteboard may not be able to see clearly, so most schools still use blackboards.

A live video showing the whiteboard captured by a camera can solve the light reflection issue and the small whiteboard issue. Thus, a method of identifying a whiteboard to generate a plain image for students sitting far away from the whiteboard is desirable. The method includes blurring, sharpening, or mosaicking to filter the private information and show the desired information on the whiteboard. Sometimes, the camera is not set in front of the whiteboard, a mapping method to show the plain image of the whiteboard is desirable.

SUMMARY OF THE INVENTION

A method of identifying a whiteboard based on image tokens includes setting a plurality of image tokens on the whiteboard, obtaining an image including the whiteboard from a camera, employing hardware or software techniques to detect image shaking in order to prevent a display of non-relevant content or privacy-sensitive information, detecting image tokens of the whiteboard by using a machine learning model, applying token tracking to the image tokens to enhance stability and robustness of token detection, calculating coordinates of the image tokens, determining an optimal mapping matrix based on the coordinates of the image tokens, mapping the image based on the optimal mapping matrix to generate a mapped image of the whiteboard, and displaying the mapped image on a screen.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
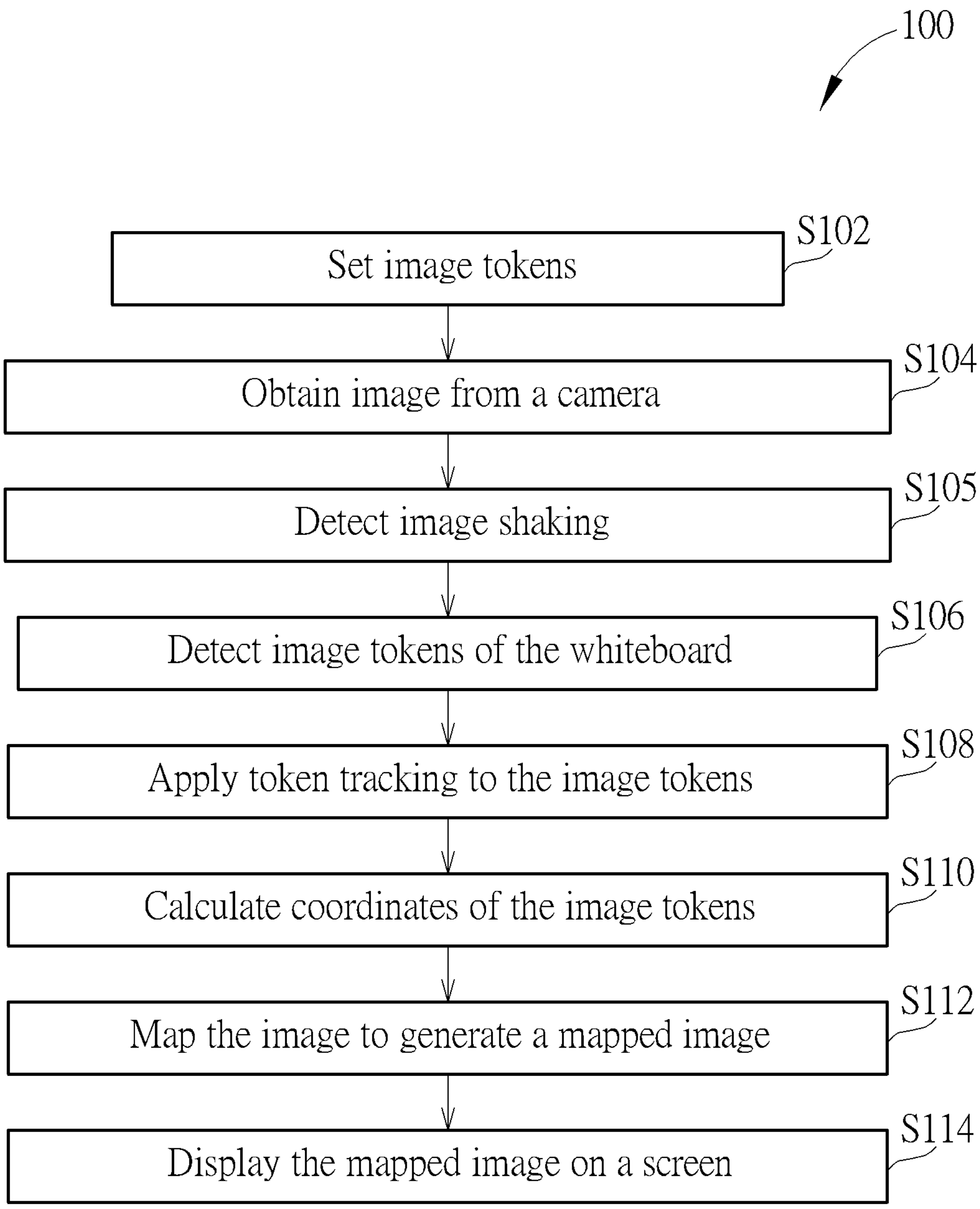
FIG. 1 is a method of identifying a whiteboard based on image tokens according to an embodiment of the present invention.

FIG. 1 is a method 100 of identifying a whiteboard based on image tokens according to an embodiment of the present invention. The method 100 comprises the following steps:

Step S102: set a plurality of image tokens on the whiteboard;

Step S104: obtain an image including the whiteboard from a camera;

Step S105: detect image shaking using hardware or software techniques in order to prevent a display of non-relevant content or privacy-sensitive information;

Step S106: detect image tokens of the whiteboard by using a machine learning model;

Step S108: apply token tracking to the image tokens to enhance stability and robustness of token detection;

Step S110: calculate coordinates of the image tokens;

Step S112: determine an optimal mapping matrix based on the coordinates of the image tokens and map the image based on the optimal mapping matrix to generate a mapped image of the whiteboard; and Step S114: display the mapped image on a screen.

In step S102, a plurality of image tokens are set on the whiteboard. The whiteboard can be a glass whiteboard, a mobile whiteboard, a projection screen, a mobile green board, or a 3M whiteboard film. The image tokens can be magnets, magic tapes, stickers, patterns such as symbols drawn by various pens (whiteboard pens or color pens), gestures, display of electronic screens or other plain images. The symbols drawn by various pens include but not limit to rectangular symbols, star symbols, diamond symbols, and line symbols. The number of the image tokens can be N, where N is an integer larger than 1. The positions of the image tokens can be but not limited to at the four corners of the whiteboard. For instance, the positions of image tokens can be near the four corners of the whiteboard. In step S104, an image including the whiteboard is obtained from a camera.

In step S105, the stability of the image can be detected by software such as an optical flow method. The system can also check whether the screen is shaking according to camera movement. The camera movement can be detected by hardware such as an accelerator, a gyroscope or another device. Detecting image shaking using hardware or software techniques can prevent a display of non-relevant content or privacy-sensitive information. In step S106, the image tokens of the whiteboard are to be detected in the image captured by the camera by the machine learning model. The machine learning model can be an artificial intelligence (AI) model, a deep learning model, a computer vision model, or a you only look once (YOLO) model.

In step S108, token tracking is applied to the image tokens to enhance stability and robustness of token detection. The token tracking is applied based on a center point based tracking system, an intersection over union based tracking system, or other tracking system. In step S110, the coordinates of the image tokens are calculated. If only M instead of N image tokens are detected (M<N), then a permission is requested to generate the remaining image tokens at or near the remaining corner automatically according to the M detected image tokens. If the automatic generation of image tokens is not allowed, then the remaining image tokens are requested to provide enough information for further processes. Likewise, if less than two image tokens are detected, then more image tokens are requested to make up the shortfall of image tokens. If M instead of N image tokens are detected (M>N), then a deletion of image tokens is requested to make sure the M detected image tokens correspond to N image tokens.

In step S112, an optimal mapping matrix can be determined based on the coordinates of the image tokens for image mapping. The image is mapped to generate a mapped image based on the optimal mapping matrix. In step S114, before displaying the mapped image on a screen, a post-processing such as blurring, sharpening, and/or mosaicking can be performed on the mapped image. The mapped image which may be post-processed is displayed on the screen for members far away from the whiteboard.

Figure 2:
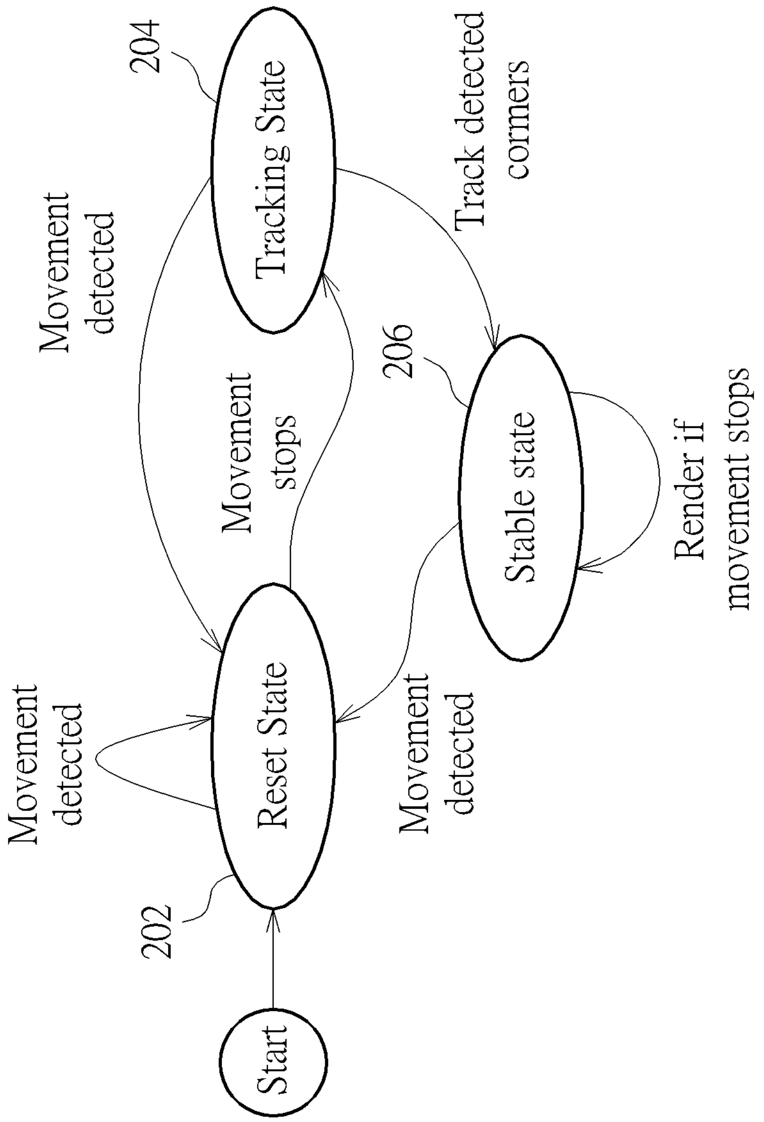
FIG. 2 shows a state machine for identifying a whiteboard based on image tokens according to an embodiment of the present invention.

FIG. 2 shows a state machine for identifying a whiteboard based on image tokens according to an embodiment of the present invention. At first, a camera is set in front of a plurality of whiteboards. When the camera is moving and trying to focus on a target whiteboard, the system which includes a processor and a memory is at a reset state because the image captured from the camera is still shaking. When the camera stops moving or the image stops shaking, the system enters the tracking state to track the image tokens of the whiteboard. After the image tokens are all detected, the system enters the stable state to display the mapped image on the screen. When the system is at the tracking state or stable state, go to reset state if camera movement or image shaking is detected. The reset state can detect the camera movement with a hardware method and can detect image shaking with a software method. The software method includes but not limited to an optical flow method. The hardware method may be implemented by an accelerator, a gyroscope or another device.

Figure 3:
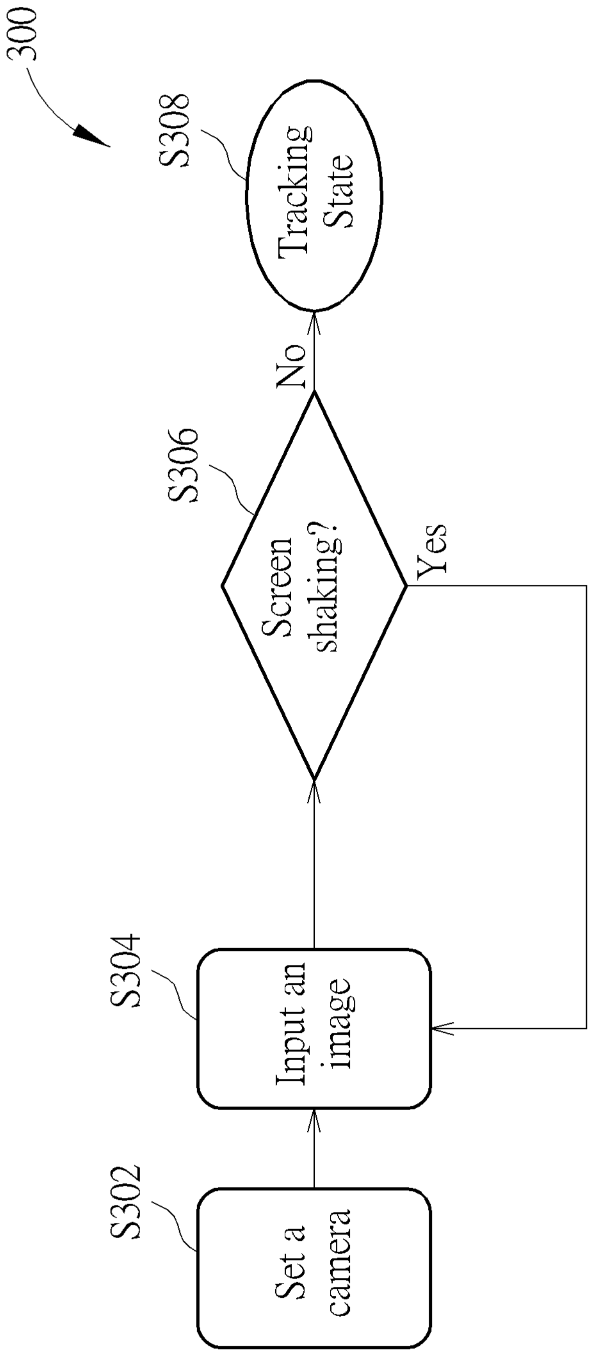
FIG. 3 is a flowchart of a method for running a reset state in FIG. 2 according to an embodiment of the present invention.

FIG. 3 is a flowchart of a method 300 for running a reset state in FIG. 2 according to an embodiment of the present invention.

Step S302: set a camera to capture the image of the whiteboard;

Step S304: input an image of the whiteboard to the system;

Step S306: check whether the screen is shaking; if so, go to step S304; else go to step S308; and Step S308: enter the tracking state.

In step S302, a camera is set to capture the image of the whiteboard. In step S304, an image of the whiteboard is inputted to the system. In step S306, the system checks whether the screen is shaking according to stability of the image. The stability of the image can be detected by software such as an optical flow method. The system can also check whether the screen is shaking according to camera movement. The camera movement can be detected by hardware such as an accelerator, a gyroscope or another device. If screen shaking is detected, step S304 is performed again to capture another image so as to check whether the screen is still shaking later on. If screen shaking is not detected, step S308 is performed to enter the tracking state.

Figure 4:
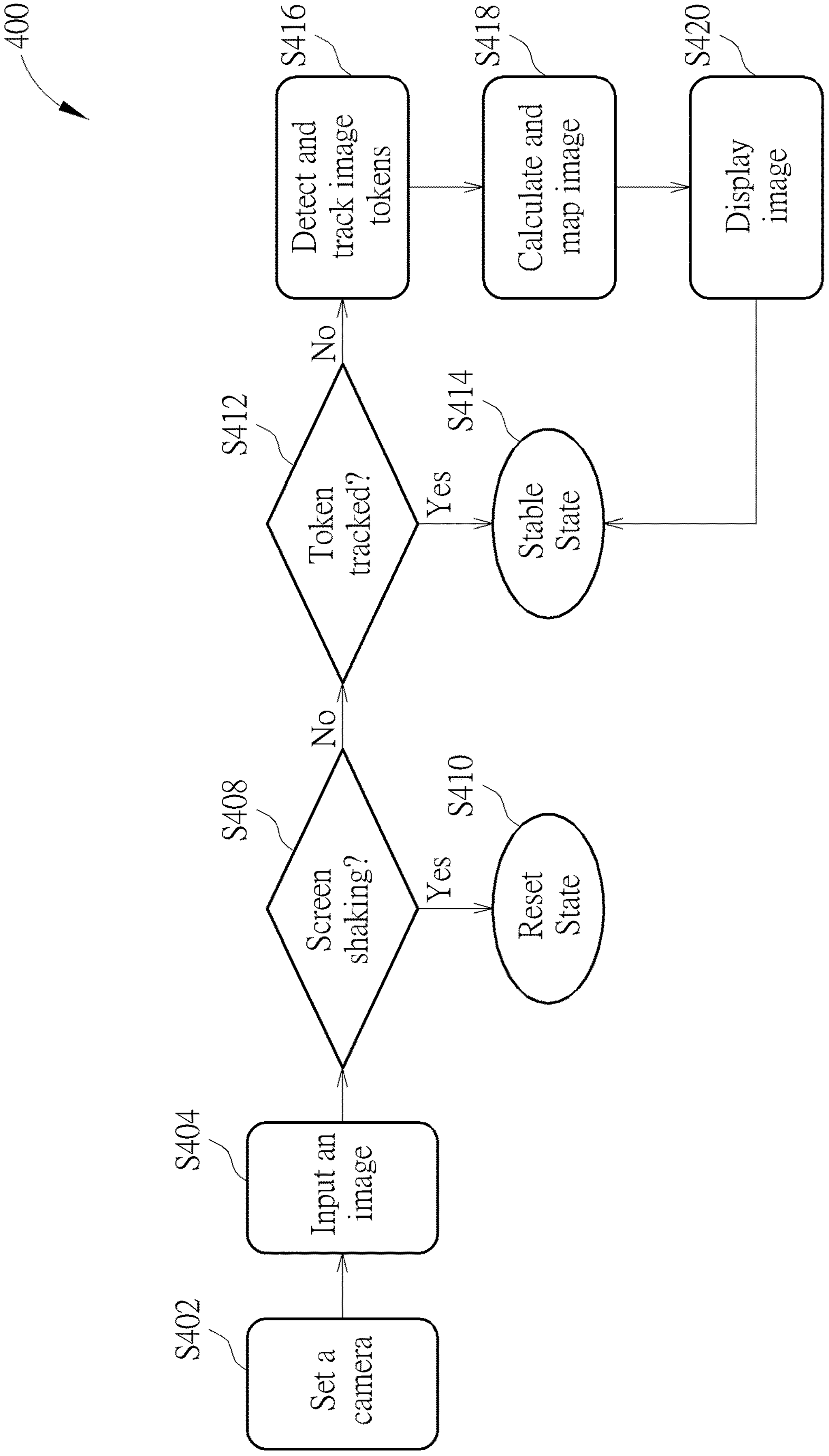
FIG. 4 is a flowchart of a method for running a tracking state in FIG. 2 according to an embodiment of the present invention.

FIG. 4 is a flowchart of a method 400 for running a tracking state in FIG. 2 according to an embodiment of the present invention.

Step S402: set a camera to capture the image of the whiteboard;

Step S404: input an image of the whiteboard to the system;

Step S408: check whether the screen is shaking; if so, go to step S410; else go to step S412;

Step S410: enter the reset state;

Step S412: check whether the image tokens are tracked; if so, go to step S414; else go to step S416;

Step S414: enter the stable state;

Step S416: detect and track image tokens of the whiteboard;

Step S418: calculate an optimal mapping matrix based on the image tokens and map the image based on the optimal mapping matrix to generate a mapped image of the whiteboard;

Step S420: display the mapped image on a screen; go to step S414.

In step S402, a camera is set to capture the image of the whiteboard. In step S404, an image of the whiteboard is inputted to the system. In step S408, the system checks whether the screen is shaking based on the software method or the hardware method as in step S306. If screen shaking is detected, go to step S410 to enter the reset state. If screen shaking is not detected, then in step S412, the system checks whether the image tokens are tracked. If the image tokens are tracked, go to step S414 to enter the stable state. If the image tokens are not tracked, step S416 is performed to detect and track the image tokens of the whiteboard by using a machine learning model. The machine learning model can be an artificial intelligence (AI) model, a deep learning model, a computer vision model, or a you only look once (YOLO) model.

In step S418, the coordinates of the image tokens are calculated. If only M instead of N image tokens are detected (M<N), then a permission is requested to generate the remaining image tokens at or near the remaining corner automatically according to the M detected image tokens. If the automatic generation of image tokens is not allowed, then the remaining image tokens are requested to provide enough information for further processes. Likewise, if less than two image tokens are detected, then more image tokens are requested to make up the shortfall of image tokens. If M instead of N image tokens are detected (M>N), then a deletion of image tokens is requested to make sure the M detected image tokens correspond to N image tokens. Then, an optimal mapping matrix can be determined based on the coordinates of the image tokens for image mapping. After that, the image is mapped to generate a mapped image based on the optimal mapping matrix. In step S420, a post-process such as blurring, sharpening, and/or mosaicking may be performed on the mapped image, and the post-processed mapped image or the mapped image is displayed on the screen.

Figure 5:
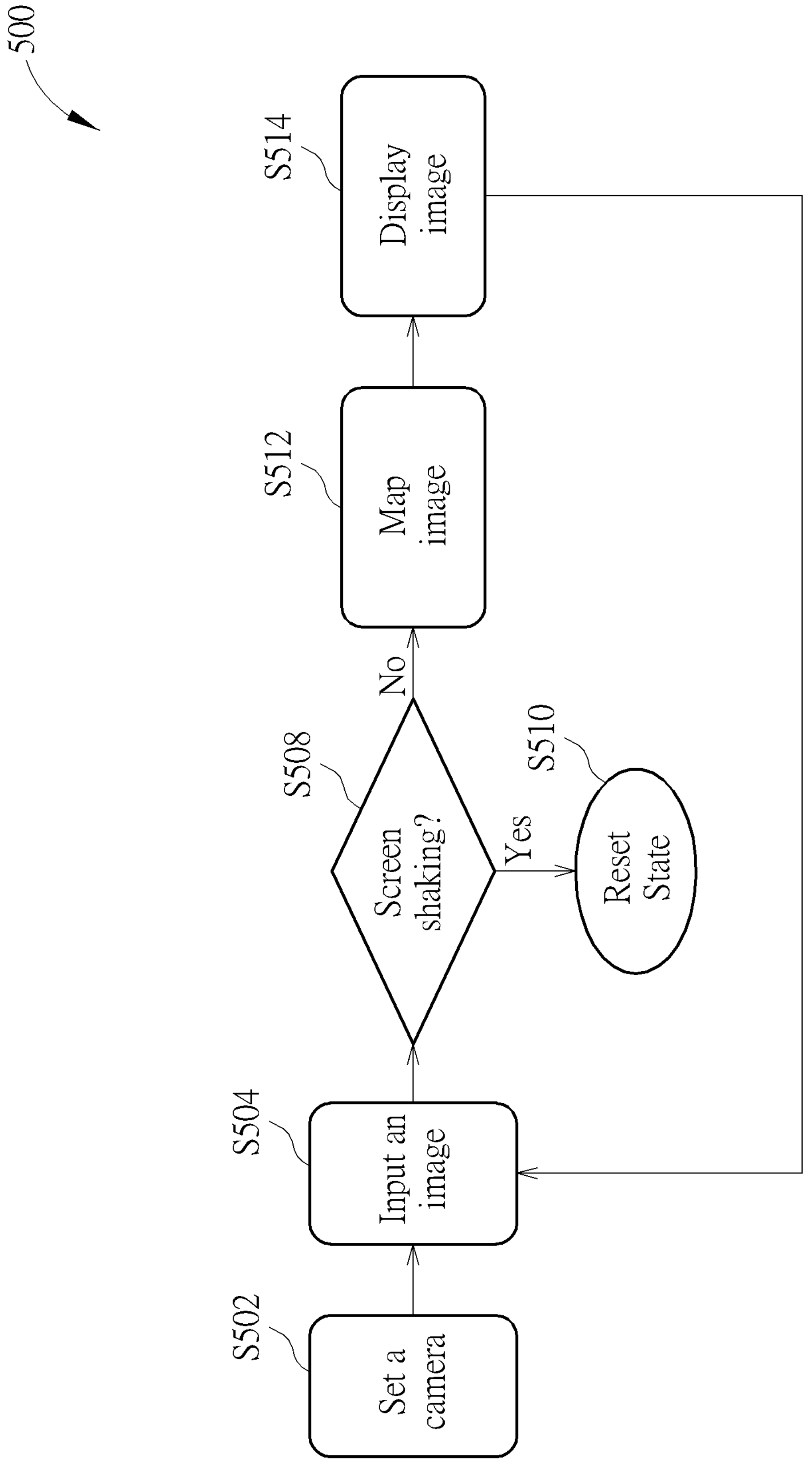
FIG. 5 is a flowchart of a method for running a stable state in FIG. 2 according to an embodiment of the present invention.

FIG. 5 is a flowchart of a method 500 for running a stable state in FIG. 2 according to an embodiment of the present invention.

Step S502: set a camera to capture an image of the whiteboard;

Step S504: input the image of the whiteboard to the system;

Step S508: check whether the screen is shaking; if so, go to step S510; else go to step S512;

Step S510: enter the reset state;

Step S512: determine an optimal mapping matrix based on the image tokens and map the image based on the optimal mapping matrix to generate a mapped image of the whiteboard; and Step S514: display the mapped image on a screen; go to step S504.

In step S502, a camera is set to capture the image of the whiteboard. In step S504, an image of the whiteboard is inputted to the system. In step S508, the system checks whether the screen is shaking based on the software method or the hardware method as in step S306. If screen shaking is detected, go to step S510 to enter the reset state. If screen shaking is not detected, then in step S512, an optimal mapping matrix can be determined based on the coordinates of the image tokens for image mapping. After that, the image is mapped to generate a mapped image based on the optimal mapping matrix. In step 514, a post-process such as blurring, sharpening, and/or mosaicking may be performed on the mapped image, and the post-processed mapped image or the mapped image is displayed on the screen. Then step S504 is performed again to continue the routine.

In conclusion, a live video showing the plain image of the whiteboard captured by a camera can be implemented by applying the method of identifying the whiteboard based on image tokens. The method uses the state machine including the reset state, stable state, and tracking state, solving the problem of light reflecting from the whiteboard for far away audiences. Moreover, the mapping technique solves the skew image problem to always show the plain image of the front side of the whiteboard. The post-processing including blurring, sharpening, and mosaicking can filter the private information and show the desired information of the whiteboard, thus avoiding privacy-sensitive information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of identifying a whiteboard based on image tokens comprising:

setting N image tokens on the whiteboard;

obtaining an image including the whiteboard from a camera;

detecting image shaking of the image;

only if image shaking of the image is not detected, detecting image tokens of the whiteboard by using a machine learning model;

if only M image tokens are detected, generating N-M image tokens either automatically or after obtaining a user permission;

applying token tracking to the N image tokens to enhance stability and robustness of token detection;

calculating coordinates of the N image tokens;

determining an optimal mapping matrix based on the coordinates of the N image tokens;

mapping the image based on the optimal mapping matrix to generate a mapped image of the whiteboard;

displaying the mapped image on a screen; and when image shaking of the image remains undetected and the N image tokens remain steady after displaying the mapped image on the screen, generating a next mapped image of the whiteboard by foregoing at least one of a re-detection of the N image tokens or a re-calculation of the optimal mapping matrix while maintaining a transformation state corresponding to the optimal mapping matrix;

wherein M<N, M is a positive integer, and N is an integer larger than 1.

2. The method of claim 1, wherein the N image tokens are magnets, magic tapes, stickers, patterns such as rectangular symbols, star symbols, diamond symbols, or line symbols drawn by a pen (a whiteboard pen or a color pen), gestures, or display of electronic screens.

3. The method of claim 1, wherein the machine learning model is artificial intelligence (AI) model, deep learning model, computer vision model, or you only look once (YOLO) model.

4. The method of claim 1, wherein setting the N image tokens on the whiteboard is setting the N image tokens at the corners of the whiteboard.

5. The method of claim 1, wherein determining an optimal mapping matrix based on the coordinates of the N image tokens is determining a warp perspective transform based on the coordinates of the N image tokens.

6. The method of claim 1, further comprising post-processing the mapped image of the whiteboard.

7. The method of claim 6, wherein post-processing the mapped image of the whiteboard comprises:

blurring, sharpening, and/or mosaicking the mapped image of the whiteboard.

8. The method of claim 1, wherein the whiteboard is a glass whiteboard, a mobile whiteboard, a projection screen, or a mobile green board.

9. The method of claim 1, wherein the token tracking is applied based on a center point based tracking system, or an intersection over union based tracking system.

10. The method of claim 1, further comprising checking if the N image tokens were detected.

* * * * *